United States Patent Office 3,405,170
Patented Oct. 8, 1968

3,405,170
PROCESS FOR THE PREPARATION OF HYDROXY NAPHTHOIC ACIDS
Joseph Levy, Paramus, and William W. Walker, Rutherford, N.J., assignors to Universal Oil Products Company, Des Plaines, Ill., a corporation of Delaware
No Drawing. Filed July 14, 1965, Ser. No. 472,005
12 Claims. (Cl. 260—520)

ABSTRACT OF THE DISCLOSURE

Preparation of hydroxy naphthoic acids by reaction of carbon dioxide with potassium naphtholates under substantially anhydrous conditions in the presence of dibutyl carbitol.

---

This invention relates to a process for the preparation of hydroxy naphthoic acids and more particularly relates to the preparation of such compounds by carboxylating a potassium naphtholate in the presence of an inert diluent.

The preparation of phenolic carboxylic acids by the carboxylation of the corresponding alkali metal phenolates involving basically the subjecting of an alkali metal phenolate to the action of carbon dioxide under relatively high pressures and temperatures is the well known reaction referred to as the Kolbe-Schmitt synthesis, Ann., 113: 125 (1860). While this reaction has also been widely used to prepare hydroxy naphthoic acids from alkali metal naphtholates, it is nevertheless a relatively difficult reaction to effect to obtain a high yield of pure hydroxy naphthoic acids, and in particular, 2-hydroxy-1-naphthoic acid. One of the major problems involved in carrying out the reaction is due to the fact that the carboxylation must be effected under substantially anhydrous conditions inasmuch as water even in minute quantities will substantially inhibit the carboxylation. This, of course, renders the preparation of an anhydrous naphtholate a critical feature of the reaction. The preparation of anhydrous alkali metal naphtholates is, however, most difficult to readily achieve because alkali metal naphtholates are hygroscopic and moreover highly sensitive to air oxidation. There are also many serious problems involved in effecting the carboxylation itself. For example, the exothermic nature of the reaction makes the reaction difficult to control to prevent the formation of large quantities of side products such as xanthones or tars, which, in addition to reducing yields, make separation and purification of the product difficult and costly.

Various proposals have been made to eliminate these problems and to facilitate the preparation of hydroxy naphthoic acids by utilizing inert diluents or solvents as reaction media for the carboxylation and in some instances for the preparation of the alkali metal naphtholates as well. Included within these solvents or diluents are a wide class of highly divergent materials such as paraffinic hydrocarbons, halogenated aromatics, amines, lower dialkyl ketones, cyclic diethers such as dioxanes, or heterocyclics such as quinolines and pyridines. These suggested diluents and solvents have not, however, been completely successful in eliminating all of the problems involved in effecting the Kolbe-Schmitt syntheses with alkali metal naphtholates and moreover, most importantly, their use has not resulted in the obtainment of high yields of hydroxy naphthoic acids in a commercially desirable manner. It has now been discovered, however, that the preparation of hydroxy naphthoic acids may be effected according to the Kolbe-Schmitt syntheses to obtain remarkably high yields of product and moreover in a highly commercially desirable manner by utilizing dibutyl carbitol as an inert diluent.

Accordingly, an object of this invention is to provide an improved process for the preparation of hydroxy naphthoic acids. Another object is to provide a process for the preparation of such acids by carboxylating the corresponding potassium naphtholate in the presence of dibutyl carbitol as diluent. A still further object is to provide a process for the preparation of such acids using the diluent to facilitate both the formation of the anhydrous potassium naphtholate and the carboxylation thereof whereby a remarkably high yield of product is obtained in a commercially desirable manner. Other objects of this invention will become apparent from the following further detailed description thereof.

The process of this invention is effected, in general, by first preparing an anhydrous mixture of the potassium naphtholate and dibutyl carbitol, also identified as the dibutyl ether of diethylene glycol, as diluent followed by carboxylation of the naphtholate with carbon dioxide in the presence of the diluent under substantially anhydrous conditions. The potassium salt of hydroxy naphthoic acid formed in the carboxylation is then readily converted to the desired hydroxy naphthoic acid and isolated.

The anhydrous mixture of potassium naphtholate and dibutyl carbitol as diluent is prepared by reacting a naphthol with potassium hydroxide in the presence of the diluent followed by removing the water from the mixture. The naphthols which are used in the reaction comprise either alpha or beta naphthol. Use of the alpha naphthol will result, of course, in the ultimate preparation in the process of 1-hydroxy-2-naphthoic acid and the use of beta naphthol will result in the preparation of 2-hydroxy-1-naphthoic acid.

The naphtholate formation is conveniently effected by mixing together appropriate amounts of the desired naphthol and dibutyl carbitol followed by treating the mixture with an aqueous potassium hydroxide solution. The conditions under which the reaction is effected are not critical. Generally, ordinary temperatures of about 25° C. are satisfactory and stoichiometric ratios of about one mol of potassium hydroxide per mol of naphthol may be utilized. The amount of the dibutyl carbitol diluent used in the process is not critical but the quantity used should at least be sufficient to render the carboxylation product, which normally is a thick viscous slurry, readily stirrable. Generally, a quantity of diluent of about 5 to 10 parts by weight of diluent per part of naphthol is sufficient for this purpose.

While the Kolbe synthesis has been effected with different alkali metal naphtholates, highly successful results are obtained in the present process using dibutyl carbitol as diluent only with potassium naphtholates. The reason for this is not known. In fact, the reason why the dibutyl carbitol diluent of this invention is so effective in obtaining high yields of pure product is also not known. It is, moreover, most surprising that the diluent of this invention, dibutyl carbitol, which does not substantially dissolve the potassium naphtholates is effective at all, inasmuch as it was generally reported that a desirable property of diluents in the Kolbe synthesis is that they be capable of solubilizing the alkali metal naphtholates.

After the mixture of potassium naphtholate and dibutyl carbitol has been prepared, the water present in the mixture resulting from the salt formation as well as the water contained in the charged potassium hydroxide solution is removed. As previously indicated, it is essential for a successful carboxylation that there be almost no water present in the mixture to retard the reaction. The water may be removed in different ways. For example, the mixture may be treated with a drying agent such as calcium oxide according to conventional techniques. Such methods, however, are not very practical and the preferred and most convenient method of drying is to distill the water from the mixture. Conveniently, such distillation is effected at low pressures of the order of about 15 mm. Hg and at elevated temperatures of about 100° to 150° C. to effectively remove completely all of the water present in the mixture. Alternatively, higher pressures may be utilized of the order of about 70 mm. Hg through use of an entraining agent such as toluene or xylene to remove the last traces of water.

The dried, substantially anhydrous mixture of potassium naphtholate and dibutyl carbitol prepared according to the above preferred procedure involving formation of the naphtholate in the presence of the diluent followed by distillation, or prepared alternatively by other procedures such as for example by mixing the naphtholate, already prepared, with the dibutyl carbitol followed by drying, is then carboxylated with carbon dioxide to form the potassium salt of the hydroxy naphthoic acid. The carboxylation is effected in general according to conventional procedures by charging the anhydrous mixture of the naphtholate and diluent to a suitable apparatus, pressurizing the apparatus with carbon dioxide and then permitting the reaction to proceed to completion at the desired temperature and pressure. In respect to the apparatus utilized, because the use of dibutyl carbitol according to this invention permits the reaction to advantageously proceed at very low pressures and even at atmospheric pressures, the carboxylation may, if desired, be conveniently effected in the same apparatus used to prepare and dry the mixture of naphtholate and diluent. While various materials such as stainless steel or glass may be suitably used in the apparatus in contact with the reaction mass, it is important that iron not be used inasmuch as this metal tends to increase the formation of tarry side products.

The temperature at which the carboxylation is effected is important and should be maintained within the range of from about 50° to 150° C. and more preferably within the range of about 100° to 130° C.. Temperatures above about 150° C. should be avoided especially when carboxylating potassium beta-naphtholate because such high temperatures favor the formation of the potassium salt of 2-hydroxy-3-naphthoic acid instead of the potassium salt of the desired isomer, 2-hydroxy-1-naphthoic acid.

The carbon dioxide pressures used are not critical and may range from atmospheric pressures to superatmospheric pressures of about 500 pounds per square inch above atmospheric pressure or higher, if desired. As previously indicated, however, the diluent of this invention advantageously permits the carboxylation to proceed smoothly and rapidly at atmospheric pressures or at very low superatmospheric pressures up to about 50 pounds per square inch and accordingly such low pressures are conveniently utilized. The time required to effect the carboxylation will vary depending upon the carboxylation conditions utilized and the naphtholate being reacted. Generally however, most carboxylations are completed in about 4 to 6 hours.

The product of the carboxylation comprising the potassium salt of a hydroxy naphthoic acid may be recovered from the carboxylation product mixture and converted to the desired acid in several different ways. One method involves simply extracting the potassium salt with water. Because of the low solubility of the potassium salt of 2-hydroxy-1-naphthoic acid in water, it is necessary that elevated temperatures of the order of about 90° C. be utilized with this salt for the water extraction so as to effectively solubilize the potassium salt and thus permit a ready separation. Conveniently, the separation is effected by charging hot water to the carboxylation product mixture, mixing for a short period and then separating the resulting aqueous layer from the dibutyl carbitol containing organic layer. The aqueous layer is then acidified with an appropriate acid such as sulfuric acid to precipitate the dydroxy naphthoic acid which is removed from the mixture by filtration, and thereupon dried to recover the desired hydroxy naphthoic acid in high purity and yield.

While extraction with water is extremely easy and convenient to effect, it is, however, not generally suitable for the preparation of a large quantity of 2-hydroxy-1-naphthoic acid. This is due to the fact that if the water extract of the carboxylation product salt is held for any lengthy period at the elevated extraction temperature made necessary because of the low solubility of the potassium salt, appreciable decarboxylation of the salt occurs. Thus, the time required to extract a large quantity of carboxylation product may be too long to prevent substantial, if not complete, decarboxylation of the potassium salt of 2-hydroxy-1-naphthoic acid to the potassium naphtholate.

Accordingly, a more suitable treatment for a large scale carboxylation to separate the potassium salt of 2-hydroxy-1-naphthoic acid from the carboxylation product mixture is to extract the salt with an aqueous sodium hydroxide solution. This extraction may be effected by simply mixing the carboxylation product mixture with an aqueous sodium hydroxide solution at ordinary temperatures of about 25° C. The resulting aqueous layer is then separated from the dibutyl carbitol organic layer and acidified with a suitable acid such as sulfuric acid to form a precipitate. This precipitate usually contains in addition to the desired hydroxy naphthoic acid some unreacted beta-naphthol, which is removed by redissolving the precipitate with an aqueous sodium bicarbonate solution mixed with an organic solvent such as toluene. The resulting aqueous layer is separated from the organic layer containing the beta-naphthol and acidified to form the 2-hydroxy-1-naphthoic acid as a precipitate which is separated by filtration. The 2-hydroxy-1-naphthoic acid is then washed with water and dried to recover a high yield of highly pure product.

Because the diluent of this invention is so effective in permitting the carboxylation to take place readily with little or no formation of tarry side products, the diluent remaining in the carboxylation product mixture after the removal of the potassium salt of the hydroxy naphthoic acid according to the above procedures and any unreacted naphthol contained therein may be directly reused in the process without purification. This, of course, adds considerably to the overall desirability of the process of this invention by greatly lowering the cost of preparing hydroxy naphthoic acids.

The process of this invention may be illustrated by the following examples which are not, however, intended to limit the generally broad scope of the present invention in strict accordance therewith:

EXAMPLE I 2-hydroxy-1-naphthoic acid was prepared according to the process of this invention by the following procedure:

About 50 grams of beta-naphthol and 500 grams of dibutyl carbitol were charged to a reaction flask equipped with a stirrer and distillation column. The mixture was stirred at about 25° C. while 42 grams of a 45 percent aqueous potassium hydroxide solution were charged to the mixture. After the formation of the potassium beta-naphtholate was complete, the mixture was distilled at a pressure of about 15 mm. Hg and a temperature of from about 130° to 140° C. to remove the water contained in the mixture. The resultant anhydrous slurry was heated to about 120° C. and the naphtholate contained therein reacted with carbon dioxide by simply bubbling the gas through the slurry at atmospheric pressure until absorption of the carbon dioxide ceased; a period requiring about 4 hours. To the thick carboxylation product mixture was added 250 grams of water at a temperature of about 90° C. The resulting aqueous layer was separated from the organic dibutyl carbitol layer, treated with about 70 grams of toluene to extract any remaining organic material and then acidified at 25° C. to a pH of about 1 to 2 by adding about 63 grams of a 50% aqueous sulfuric acid solution. The precipitated 2-hydroxy-1-naphthoic acid was separated from the mixture by filtration, washed free of acid with water and dried to recover about 47.4 grams of product constituting a yield of 72.7 percent.

EXAMPLE II 1-hydroxy-2-naphthoic acid is prepared according to the process of this invention by the following procedure:

About 20 grams of alpha naphthol and 200 grams of dibutyl carbitol are charged to a reaction flask equipped with a stirrer and distillation column. The mixture is stirred at about 25° C. while about 16.8 grams of a 45 percent aqueous potassium hydroxide solution are charged to the mixture. After the formation of the potassium alpha naphtholate is complete, the resulting suspension is distilled at a pressure of about 15 mm. Hg and a temperature of about 135° C. to remove the water. The anhydrous suspension is then transferred to a Parr pressure reaction apparatus. The potassium naphtholate contained in the suspension is then carboxylated by reacting it with carbon dioxide under a pressure of about 15 to 20 pounds per square inch gage and a temperature of about 120° C. The carboxylation product is mixed with water at about 90° C. and the aqueous layer is separated from the organic dibutyl carbitol-containing organic layer and acidified with hydrochloric acid until no further precipitate forms. The precipitated 1-hydroxy-2-naphthoic acid is separated by filtration and dried to recover a high yield of pure product.

EXAMPLE III 2-hydroxy-1-naphthoic acid was prepared according to the process of this invention by the following procedure:

About 20 grams of beta-naphthol and 200 grams of dibutyl carbitol were charged to a reaction flask equipped with a stirrer and distillation column. The mixture was stirred at about 25° C. while 16.8 grams of a 45 percent aqueous potassium hydroxide solution were charged to the mixture. After the formation of the potassium beta-naphtholate was complete, the resulting suspension was distilled at a pressure of about 15 mm. Hg and a temperature of about 135° C. to remove the water. The anhydrous suspension was then transferred to a Parr pressure reaction apparatus. The potassium naphtholate contained in the suspension was then carboxylated by reaction with carbon dioxide under a pressure of about 15 to 20 pounds per square inch gage for about 2 hours at a temperature of about 80° to 90° C. To the thick carboxylation product mixture was added about 125 milliliters of water at a temperature of about 90° C. and the resulting aqueous layer was separated from the dibutyl carbitol-containing organic layer. The organic layer was washed with about 75 grams of water at 90° C. and the water wash was combined with the separated aqueous layer. The combined aqueous mixture was treated with toluene to extract any organic material and thereafter acidified with an aqueous hydrochloric acid solution to a pH of about 1 to 2. The resultant precipitated 2-hydroxy-1-naphthoic acid was separated by filtration and dried to recover about 16.3 grams of product constituting a yield of 61.9 percent.

We claim as our invention:

1. A process for preparing a hydroxy naphthoic acid which comprises reacting carbon dioxide with a potassium naphtholate under substantially anhydrous conditions in the presence of dibutyl carbitol, and thereafter recovering the desired product.

2. A process for preparing a hydroxy naphthoic acid which comprises reacting carbon dioxide with a potassium naphtholate under substantially anhydrous conditions at a temperature of from about 50° to 150° C. in the presence of dibutyl carbitol and thereafter recovering the desired product.

3. A process for preparing a hydroxy naphthoic acid which comprises reacting carbon dioxide with a potassium naphtholate under substantially anhydrous conditions at superatmospheric pressure and at a temperature of from about 50° to 150° C. in the presence of dibutyl carbitol, and thereafter recovering the desired product.

4. A process for preparing 1-hydroxy-2-naphthoic acid which comprises reacting carbon dioxide with potassium alpha naphtholate under substantially anhydrous conditions at a temperature of from about 50° to 150° C. in the presence of dibutyl carbitol and thereafter recovering the desired product.

5. A process for preparing 2-hydroxy-1-napthoic acid which comprises reacting carbon dioxide with potassium beta-naphtholate under substantially anhydrous conditions at a temperature of from about 50° C. to 150° C. and at atmospheric pressure in the presence of dibutyl carbitol and thereafter recovering the desired product.

6. A process for preparing 2-hydroxy-1-naphthoic acid which comprises reacting carbon dioxide with potassium beta-naphtholate under substantially anhydrous conditions at a temperature of from about 50° C. to 150° C. and at a pressure above atmospheric of about 5 to 50 pounds per squire inch in the presence of dibutyl carbitol and thereafter recovernig the desired product.

7. A process for preparing a hydroxy naphthoic acid which comprises: (A) reacting a naphthol with potassium hydroxide in the presence of dibutyl carbitol; (B) removing the water present in the resulting mixture of potassium naphtholate and dibutyl carbitol; (C) reacting the potassium naphtholate contained in the dibutyl carbitol with carbon idoxide under substantially anhydrous conditions; and (D) thereafter recovering the desired product.

8. A process for preparing a hydroxy naphthoic acid which comprises: (A) reacting a naphthol with potassium hydroxide in the presence of dibutyl carbitol; (B) removing the water present in the resulting mixture of potassium naphtholate and dibutyl carbitol by distillation; (C) reacting the potassium naphtholate contained in the dibutyl carbitol with carbon dioxide under subtsantially anhydrous conditions at a temperature of from about 50° to 150° C.; and (D) thereafter recovering the desired product.

9. A process for preparing a hydroxy naphthoic acid which comprises: (A) reacting a naphthol with potassium hydroxide in the presence of dibutyl carbitol; (B) removing water present in the resulting mixture of potassium naphtholate and dibutyl carbitol by distillation; (C) reacting the potassium naphtholate contained in the dibutyl carbitol with carbon dioxide under substantially anhydrous conditions at superatmcspheric pressures and at a temperature of from about 50° to 150° C.; and (D) thereafter recovering the desired product.

10. A process for preparing 1-hydroxy-2-naphthoic acid which comprises: (A) reacting alpha-naphthol with potassium hydroxide in the presence of dibutyl carbitol; (B) removing the water present in the resulting mixture of potassium alpha-naphtholate and dibutyl carbitol by distillation; (C) reacting the potassium alpha-naphtholate contained in the dibutyl carbitol with carbon dioxide under substantially anhydrous conditions at a temperature of from about 50° to 150° C.; and (D) thereafter recovering the desired product.

11. A process for preparing 2-hydroxy-1-naphthoic acid which comprises: (A) reacting beta-naphthol with potassium hydroxide in the presence of dibutyl carbitol; (B) removing the water present in the resulting mixture of potassium beta-naphtholate and dibutyl carbitol by distillation; (C) reacting the potassium beta-naphtholate contained in the dibutyl carbitol with carbon dioxide under substantially anhydrous conditions at a temperature of from about 50° to 150° C. and at atmospheric pressure; and (D) thereafter recovering the desired product.

12. A process for preparing 2-hydroxy-1-naphthoic acid which comprises: (A) reacting beta-naphthol with potassium hydroxide in the presence of dibutyl carbitol; (B) removing the water present in the resulting mixture of potassium beta-naphtholate and dibutyl carbitol by distillation; (C) reacting the potassium beta-naphtholate contained in the dibutyl carbitol with carbon dioxide under substantially anhydrous conditions at a temperature of from about 50° C. to 150° C. and at a pressure above atmospheric of about 5 to 50 pounds per square inch; and (D) thereafter recovering the desired product.

References Cited

UNITED STATES PATENTS 2,807,643    10/1957    Hartley et al. _____ 260—521

LORRAINE A. WEINBERGER, *Primary Examiner.*

D. E. STENZEL, *Assistant Examiner.*